US007440288B1

(12) United States Patent
Chang

(10) Patent No.: US 7,440,288 B1
(45) Date of Patent: Oct. 21, 2008

(54) CASING AND ELECTRONIC DEVICE USING THE SAME

(75) Inventor: Lin-Wei Chang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/842,383

(22) Filed: Aug. 21, 2007

(51) Int. Cl.
*H05K 5/00* (2006.01)

(52) U.S. Cl. ........................ 361/755; 361/801; 361/802

(58) Field of Classification Search ................ 361/755, 361/756, 683, 796, 740, 725, 759, 801, 802; 312/223
See application file for complete search history.

(56) References Cited

U.S. PATENT DOCUMENTS

| | | | | |
|---|---|---|---|---|
| 6,138,839 A | * | 10/2000 | Cranston et al. | 211/41.17 |
| 6,160,712 A | * | 12/2000 | Itai et al. | 361/759 |
| 6,215,668 B1 | * | 4/2001 | Hass et al. | 361/759 |
| 6,357,603 B1 | * | 3/2002 | Dingman | 211/41.17 |
| 6,480,392 B1 | * | 11/2002 | Jiang | 361/755 |
| 7,035,117 B2 | * | 4/2006 | Chen et al. | 361/801 |

* cited by examiner

*Primary Examiner*—Hung S Bui
(74) *Attorney, Agent, or Firm*—J.C. Patents

(57) ABSTRACT

A casing for carrying a detachable expansion card having a connecting plate includes a main frame, a first limit element and a second limit element. The main frame has a first surface for leaning against the connecting plate partially, a second surface and a third surface. The first limit element pivoted to the main frame swings about a first axis between a first location and a second location. The second limit element pivoted to the main frame, disposed on the second surface and adjacent to the first limit element swings about a second axis between a third location and a fourth location. The first limit element locked by the second limit element locks the connecting plate and covers part of the third surface to fix the detachable expansion card in the casing when the first and the second limit elements are located at the second and the fourth locations respectively.

16 Claims, 3 Drawing Sheets

CASING AND ELECTRONIC DEVICE USING THE SAME

BACKGROUND OF THE INVENTION

1. Field of the Invention

The present invention generally relates to a casing, and more particularly, to an electronic device using the casing.

2. Description of Related Art

Along with the developments of science and technology, a computer has become one of the necessities in human's life and work. Computers not only make the storages of various information more convenient, delivering information faster and paperwork jobs simpler, but also provide people with a lot of conveniences in basic necessities of life and entertainment.

A computer host includes a casing, a motherboard, memories, a CPU (central processing unit), data storage equipments and various expansion cards, wherein a data storage equipment is, for example, an HDD (hard disc device) or an ODD (optical disk drive), while an expansion card is, for example, a sound card or a display card.

In order to assemble an expansion card in a computer host in the prior art, the expansion card is usually inserted into an expansion slot on the motherboard, following by tightening the expansion card in the casing using screws and a hand tool so as to stably connect the peripheral devices, such as a display, to one of the ports of the expansion card.

However, tightening an expansion card by using screws not only has the problems of more time consumption and inconvenience, but also needs an additional hand tool for assembling and detaching the expansion card. The screws after being disassembled get easily lost, and in particular, the screws after being repeatedly used tend to be worn so as to increase the difficulty of being disassembled or tightened.

SUMMARY OF THE INVENTION

Accordingly, the present invention is directed to a casing to simplify the step of assembling and detaching a detachable expansion card.

The present invention is also directed to an electronic device to simplify the step of assembling and detaching a detachable expansion card.

The present invention provides a casing suitable for carrying at least a detachable expansion card having a connecting plate. The casing includes a main frame, a first limit element and at least a second limit element. The main frame has a first surface suitable to partially lean against the connecting plate, a second surface substantially parallel to the first surface and a third surface connecting the first surface and the second surface. The first limit element is pivoted at the main frame, and the second limit element is pivoted at the main frame, disposed on the second surface and adjacent to the first limit element. The first limit element is suitable to swing between a first location and a second location about a first axis, while the second limit element is suitable to swing between a third location and a fourth location about a second axis. When the detachable expansion card is disposed in the casing, the first limit element is located at the second location and the second limit element is located at the fourth location, the second limit element locks the first limit element and the first limit element locks the connecting plate and partially covers the third surface so as to fix the detachable expansion card in the casing.

In an embodiment of the present invention, the above-mentioned casing further includes at least a third limit element disposed on the first surface. When the detachable expansion card is disposed in the casing, the first limit element is located at the second location and the second limit element is located at the fourth location, the connecting plate is restricted between the first limit element and the third limit element.

In an embodiment of the present invention, the above-mentioned third limit element has an assembling hole. When the detachable expansion card is disposed in the casing, the first limit element is located at the second location and the second limit element is located at the fourth location, an end of the connecting plate is disposed in the assembling hole and another end of the connecting plate is locked by the first limit element.

In an embodiment of the present invention, the above-mentioned casing further includes at least a third limit element disposed on the first surface. When the detachable expansion card is fixed in the casing, the connecting plate leans against the third limit element.

In an embodiment of the present invention, the above-mentioned first limit element has at least a first limit portion and at least a second limit portion. When the detachable expansion card is disposed in the casing, the first limit element is located at the second location and the second limit element is located at the fourth location, the second limit element locks the first limit portion and the second limit portion locks the connecting plate.

In an embodiment of the present invention, the above-mentioned first limit portion has a notch and the first limit element further has at least an elastic portion. When the detachable expansion card is disposed in the casing, the first limit element is located at the second location and the second limit element is located at the fourth location, the second limit element leans against the notch and the elastic portion is adjacent to the third surface.

In an embodiment of the present invention, the above-mentioned first axis is substantially perpendicular to the second axis, and the first axis is parallel to the first surface, the second surface and the third surface.

In an embodiment of the present invention, when the above-mentioned first limit element is located at the first location and the second limit element is located at the third location, the second limit element does not lock the first limit element and the first limit element does not lock the connecting plate so that the detachable expansion card is suitable to be detached from the casing.

The present invention further provides an electronic device suitable for carrying at least a detachable expansion card. The detachable expansion card has a first circuit board and a connecting plate connected to a side of the first circuit board. The electronic device includes a casing and a second circuit board. The casing includes a main frame, a first limit element and at least a second limit element. The main frame has a first surface suitable to partially lean against the connecting plate, a second surface substantially parallel to the first surface and a third surface connecting the first surface and the second surface. The first limit element is pivoted at the main frame, and the second limit element is pivoted at the main frame, disposed on the second surface and adjacent to the first limit element. The first limit element is suitable to swing between a first location and a second location about a first axis, while the second limit element is suitable to swing between a third location and a fourth location about a second axis. The second circuit board is fixed in the casing and has at least an expansion slot. When the first circuit board is disposed in the expansion slot and electrically connected to the second circuit board, the first limit element is located at the second location and the second limit element is located at the fourth location, the second limit element locks the first limit element and the first limit element locks the connecting plate and partially covers the third surface so as to fix the detachable expansion card in the casing.

In an embodiment of the present invention, the above-mentioned casing further includes at least a third limit element disposed on the first surface. When the first circuit board is disposed in the expansion slot and electrically connected to the second circuit board, the first limit element is located at the second location and the second limit element is located at the fourth location, the connecting plate is restricted between the first limit element and the third limit element.

In an embodiment of the present invention, the above-mentioned third limit element has an assembling hole. When the first circuit board is disposed in the expansion slot and electrically connected to the second circuit board, the first limit element is located at the second location and the second limit element is located at the fourth location, an end of the connecting plate is disposed in the assembling hole and another end of the connecting plate is locked by the first limit element.

In an embodiment of the present invention, the above-mentioned casing further includes at least a third limit element disposed on the first surface. When the detachable expansion card is fixed in the casing, the connecting plate leans against the third limit element.

In an embodiment of the present invention, the above-mentioned first limit element has at least a first limit portion and at least a second limit portion. When the first circuit board is disposed in the expansion slot and electrically connected to the second circuit board, the first limit element is located at the second location and the second limit element is located at the fourth location, the second limit element locks the first limit portion and the second limit portion locks the connecting plate.

In an embodiment of the present invention, the above-mentioned first limit portion has a notch and the first limit element further has at least an elastic portion. When the first circuit board is disposed in the expansion slot and electrically connected to the second circuit board, the first limit element is located at the second location and the second limit element is located at the fourth location, the second limit element leans against the notch and the elastic portion is adjacent to the third surface.

In an embodiment of the present invention, the above-mentioned first axis is substantially perpendicular to the second axis and the first axis is parallel to the first surface, the second surface and the third surface.

In an embodiment of the present invention, when the above-mentioned first limit element is located at the first location and the second limit element is located at the third location, the second limit element does not lock the first limit element and the first limit element does not lock the connecting plate so that the detachable expansion card is suitable to be detached from the expansion slot.

In the present invention, the detachable expansion card is assembled into the casing by locking without screws and hand tool, therefore, the detachable expansion card is easier to be assembled into and detached from the casing.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 1:
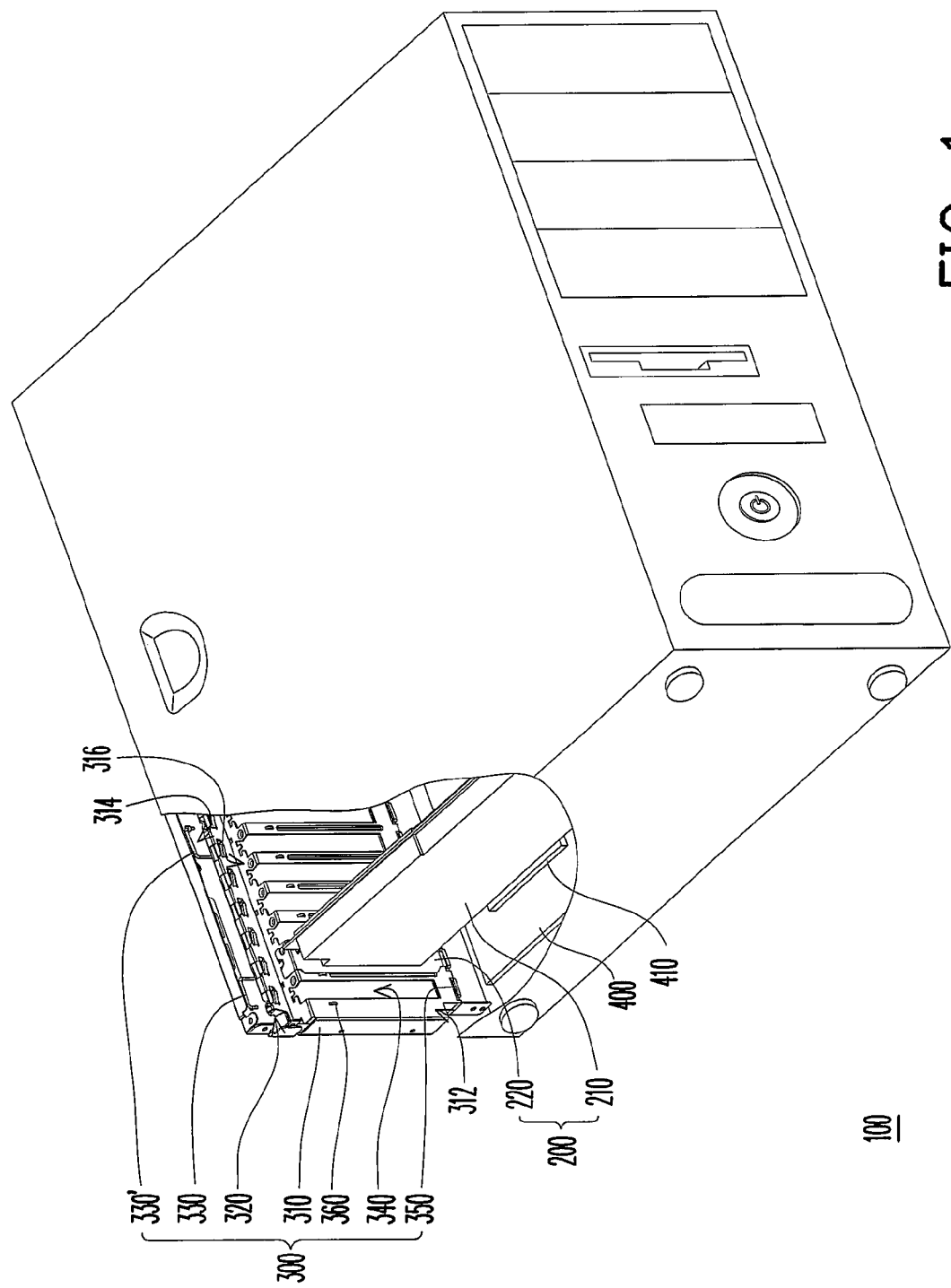
FIG. 1 is a 3D-diagram of an electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
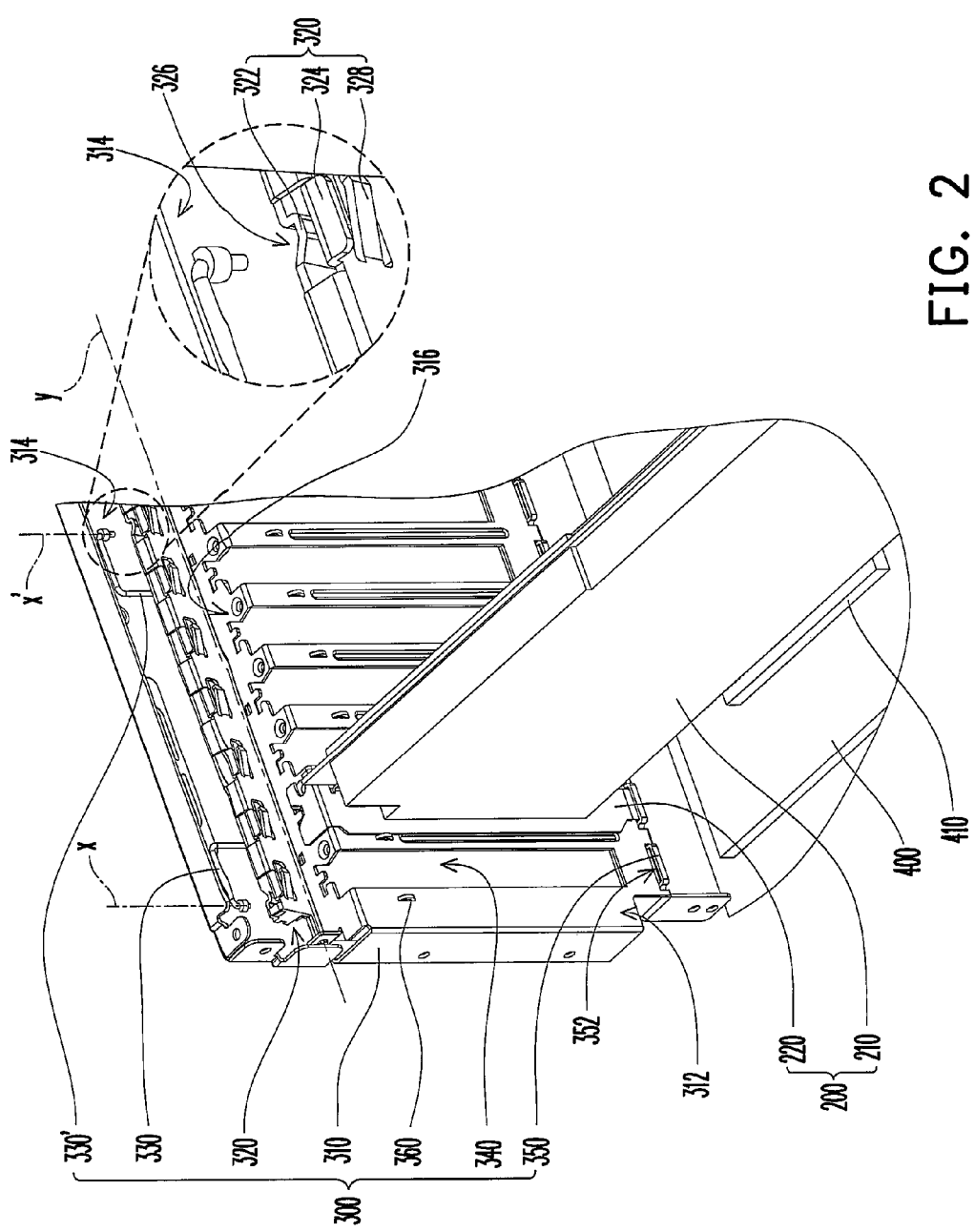
FIG. 2 is a partially enlarged 3D-diagram showing the detachable expansion card in FIG. 1 not being locked yet.
Figure 3:
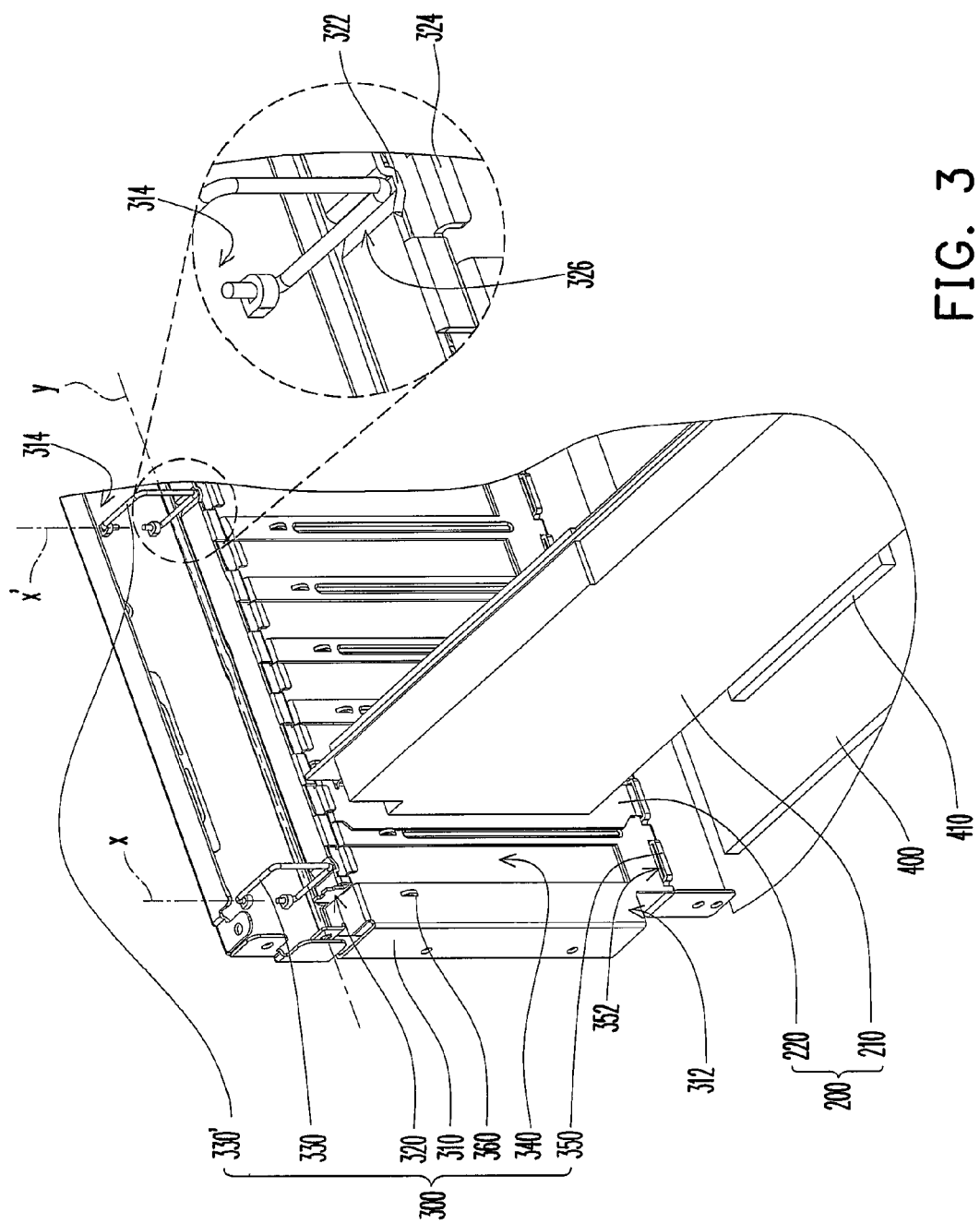
FIG. 3 is a partially enlarged 3D-diagram showing the detachable expansion card in FIG. 1 after being locked.

FIG. 1 is a 3D-diagram of an electronic device according to an embodiment of the present invention, FIG. 2 is a partially enlarged 3D-diagram showing the detachable expansion card in FIG. 1 not being locked yet and FIG. 3 is a partially enlarged 3D-diagram showing the detachable expansion card in FIG. 1 after being locked. Referring to FIGS. 1 to 3, an electronic device 100 is suitable to carry at least a detachable expansion card 200 (only one is shown among all the above-mentioned figures). The detachable expansion card 200 includes a circuit board 210, a connecting plate 220 connected to a side of the circuit board 210 and at least a port (not shown) disposed at the connecting plate 220. The electronic device 100 is, for example, computer host, the detachable expansion card 200 is, for example, sound card, network card or display card, and the port is, for example, line in or line out port for audio I/O, D-SUB (D-subminiature) port, port for outputting images, such as DVI (digital visual interface) or HDMI (high definition multimedia interface), or RJ port. (registered jack port).

The electronic device 100 includes a casing 300 and a circuit board 400. The circuit board 400 is fixed in the casing 300 and, for example, is a motherboard having at least an expansion slot 410 (only one is shown among all the above-mentioned figures). The casing 300 includes a main frame 310, a limit element 320, a limit element 330 and a limit element 330'. The main frame 310 has a surface 312 suitable to partially lean against the connecting plate 220, a surface 314 substantially parallel to the surface 312 and a surface 316 connecting the surfaces 312 and the surfaces 314. The limit element 320 is pivoted at the main frame 310. The limit elements 330 and 330' are pivoted at the main frame 310, disposed on the surface 314 and adjacent to the limit element 320. The limit element 320 is suitable for swinging about an axis y between a first location (as shown in FIG. 2) and a second location (as shown in FIG. 3). The limit elements 330 and 330' are suitable for swinging respectively about an axis x and an axis x'. In the embodiment, the limit element 330 has two swing-limiting points of a third location (as shown in FIG. 2) and a fourth location (as shown in FIG. 3), while the limit element 330' has two swing-limiting points of a fifth location (as shown in FIG. 2) and a sixth location (as shown in FIG. 3).

When the limit element 320 is located at the first location (as shown in FIG. 2) and the limit elements 330 and 330' are respectively located at the third location and the fifth location (as shown in FIG. 2), the limit elements 330 and 330' do not lock the limit element 320 and the limit element 320 does not lock the connecting plate 220 so that the detachable expansion card 200 is able to be detached from the casing 300. When the circuit board 210 is disposed in the expansion slot 410 and electrically connected to the circuit board 400, the limit element 320 is located at the second location (as shown in FIG. 3) and the limit elements 330 and 330' are respectively located at the fourth location and sixth location (as shown in FIG. 3), the limit elements 330 and 330' lock the limit element 320 and the limit element 320 locks the connecting plate 220 and partially covers the surface 316 so as to fix the detachable expansion card 200 in the casing 300. Note that since the detachable expansion card 200 is able to be assembled and detached as the limit elements 320, 330 and 330' being swung, thus, it is very easy for assembling and detaching the detachable expansion card 200 and a hand tool is unnecessary to be used.

In more detail, the casing 300 has, for example, multiple exposing holes 340 and further includes multiple limit elements 350 and multiple limit elements 360. The limit elements 350 are disposed on the surface 312 and respectively corresponding to the assembling holes 340, wherein each limit element 350 has, for example, an assembling hole 352. The limit elements 360 are also disposed on the surface 312 and respectively corresponding to the assembling holes 340. In addition, the limit element 320 has, for example, at least a limit portion 322 (only two are shown among all the above-mentioned figures), at least a limit portion 324 (multiple limit portions are shown among all the above-mentioned figures) and at least an elastic portion 328 (multiple elastic portions are shown among all the above-mentioned figures). Each the limit portion 322 has, for example, a notch 326 and the limit portions 322 are respectively corresponding to the limit elements 330 and 330'. Besides, the limit portions 324 are respectively corresponding to the exposing holes 340 and the elastic portions 328 are respectively corresponding to the exposing holes 340. Note that in the embodiment, each the limit element 350, each the limit element 360 and each the limit portion 324 are respectively located at different sides of a corresponding exposing hole 340.

Moreover, the process of assembling and detaching the detachable expansion card 200 includes following steps. First, in order to assemble a detachable expansion card 200 onto the circuit board 400, the circuit board 210 may be inserted into the expansion slot 410 to electrically connect the circuit board 300; and at the time the bended circuit board 220 may be disposed on the surfaces 312 and 316, the circuit board 220 may lean against a corresponding limit element 360 and an end of the circuit board 220 may be disposed in a corresponding assembling hole 352. In addition, the port (not shown) of the detachable expansion card 200 may be exposed outside the casing through the corresponding exposing hole 340.

Next, the limit element 320 may be swung from the first location (as shown in FIG. 2) to the second location (as shown in FIG. 3) so as to lock another end of the connecting plate 220 by the corresponding limit portion 324. Then, the limit elements 330 and 330' may be swung respectively from the third and the fifth locations (as shown in FIG. 2) to the fourth and sixth locations (as shown in FIG. 3), so that the limit elements 330 and 330' respectively lock the limit portions 322 (i.e., the limit elements 330 and 330' respectively lean against the notches 326), the connecting plate 220 is restricted between the limit elements 320 and 350 and the detachable expansion card 200 is fixed in the casing 300. At the time, the elastic portions 328 are adjacent to the surface 316, and one of the elastic portions 328 contacts with the connecting plate 220 disposed on the surface 316 and is compressed, so that the limit elements 330 and 330' are more tightly fitted with the notches 326.

Note that when the detachable expansion card 220 is fixed in the casing 300, the part of the U-shape limit element 330 contacting with the corresponding notch 326 may be perpendicular to the surface 314, and the notch 326 is extended along the direction perpendicular to the surface 314. The relationship between the limit element 330' and the corresponding notch 326 is the same as the above described, so it is omitted to describe.

Further, when the detachable expansion card 200 is going to be detached from the circuit board 400, the limit elements 330 and 330' may be respectively swung from the fourth and the sixth locations (as shown in FIG. 3) to the third and fifth locations (as shown in FIG. 2). Then, the limit element 320 may be swung from the second location (as shown in FIG. 3) to the first location (as shown in FIG. 2) so that the detachable expansion card 200 may be take away from the casing 300.

In the above-mentioned embodiment, the swing direction of the limit element 330 is opposite to that of the limit element 330', and the limit elements 330 and 330' respectively lock both ends of the limit element 320. In another embodiment however, the limit element 330' may be ignored and the limit element 330 may be adjacent to the middle location of the limit element 320. In yet another embodiment, the swing direction of the limit element 330 is the same as that of the limit element 330'. In addition, when the limit element 320 is longer, the casing 300 may include other multiple limit elements 330 or other multiple limit elements 330'. The above-mentioned axes x and x' are substantially perpendicular to the axis y and the axis y is parallel to the surfaces 312, 314 and 316. However, the axes x, x' and y may be allowed to have other orientations depending on the design requirement.

In summary, in the present invention, the detachable expansion card is assembled into the casing by locking without screws and hand tools, therefore, the detachable expansion card is easier to be assembled into and detached from the casing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A casing, suitable to carry at least a detachable expansion card having a connecting plate, wherein the casing comprises:
   a main frame, having a first surface suitable to partially lean against the connecting plate, a second surface substantially parallel to the first surface and a third surface connecting the first surface and the second surface;
   a first limit element, pivoted at the main frame, wherein the first limit element is suitable to swing about a first axis between a first location and a second location; and
   at least a second limit element, pivoted at the main frame, disposed on the second surface and adjacent to the first limit element, wherein the second limit element is suitable to swing about a second axis between a third location and a fourth location, and when the detachable expansion card is disposed in the casing, the first limit element is located at the second location and the second limit element is located at the fourth location, the second limit element locks the first limit element and the first limit element locks the connecting plate and partially covers the third surface so as to fix the detachable expansion card in the casing.

2. The casing according to claim 1, further comprising at least a third limit element disposed on the first surface, and when the detachable expansion card is disposed in the casing, the first limit element is located at the second location and the second limit element is located at the fourth location, the connecting plate is restricted between the first limit element and the third limit element.

3. The casing according to claim 2, wherein the third limit element has an assembling hole, and when the detachable expansion card is disposed in the casing, the first limit element is located at the second location and the second limit element is located at the fourth location, an end of the connecting plate is disposed in the assembling hole and another end of the connecting plate is locked by the first limit element.

4. The casing according to claim 1, further comprising at least a fourth limit element disposed on the first surface, and when the detachable expansion card is fixed in the casing, the connecting plate leans against the fourth limit element.

5. The casing according to claim 1, wherein the first limit element has at least a first limit portion and at least a second limit portion, and when the detachable expansion card is disposed in the casing, the first limit element is located at the second location and the second limit element is located at the fourth location, the second limit element locks the first limit portion and the second limit portion locks the connecting plate.

6. The casing according to claim 5, wherein the first limit portion has a notch and the first limit element further has at least an elastic portion, and when the detachable expansion card is disposed in the casing, the first limit element is located at the second location and the second limit element is located at the fourth location, the second limit element leans against the notch and the elastic portion is adjacent to the third surface.

7. The casing according to claim 1, wherein the first axis is substantially perpendicular to the second axis, and the first axis is parallel to the first surface, the second surface and the third surface.

8. The casing according to claim 1, wherein when the first limit element is located at the first location and the second limit element is located at the third location, the second limit element does not lock the first limit element and the first limit element does not lock the connecting plate so that the detachable expansion card is suitable to be detached from the casing.

9. An electronic device, suitable to carry at least a detachable expansion card having a first circuit board and a connecting plate connected to a side of the first circuit board, wherein the electronic device comprises:
a casing, comprising:
a main frame, having a first surface suitable to partially lean against the connecting plate, a second surface substantially parallel to the first surface and a third surface connecting the first surface and the second surface;
a first limit element, pivoted at the main frame, wherein the first limit element is suitable to swing about a first axis between a first location and a second location; and
at least a second limit element, pivoted at the main frame, disposed on the second surface and adjacent to the first limit element, wherein the second limit element is suitable to swing about a second axis between a third location and a fourth location; and
a second circuit board, fixed in the casing and having at least an expansion slot, wherein when the first circuit board is disposed in the expansion slot and electrically connected to the second circuit board, the first limit element is located at the second location and the second limit element is located at the fourth location, the second limit element locks the first limit element and the first limit element locks the connecting plate and partially covers the third surface so as to fix the detachable expansion card in the casing.

10. The electronic device according to claim 9, wherein the casing further comprises at least a third limit element disposed on the first surface, and when the first circuit board is disposed in the expansion slot and electrically connected to the second circuit board, the first limit element is located at the second location and the second limit element is located at the fourth location, the connecting plate is restricted between the first limit element and the third limit element.

11. The electronic device according to claim 10, wherein the third limit element has an assembling hole, and when the first circuit board is disposed in the expansion slot and electrically connected to the second circuit board, the first limit element is located at the second location and the second limit element is located at the fourth location, an end of the connecting plate is disposed in the assembling hole and another end of the connecting plate is locked by the first limit element.

12. The electronic device according to claim 9, wherein the casing further comprises at least a fourth limit element disposed on the first surface, and when the detachable expansion card is fixed in the casing, the connecting plate leans against the fourth limit element.

13. The electronic device according to claim 9, wherein the first limit element has at least a first limit portion and at least a second limit portion, and when the first circuit board is disposed in the expansion slot and electrically connected to the second circuit board, the first limit element is located at the second location and the second limit element is located at the fourth location, the second limit element locks the first limit portion and the second limit portion locks the connecting plate.

14. The electronic device according to claim 13, wherein the first limit portion has a notch and the first limit element further has at least an elastic portion, and when the first circuit board is disposed in the expansion slot and electrically connected to the second circuit board, the first limit element is located at the second location and the second limit element is located at the fourth location, the second limit element leans against the notch and the elastic portion is adjacent to the third surface.

15. The electronic device according to claim 9, wherein the first axis is substantially perpendicular to the second axis, and the first axis is parallel to the first surface, the second surface and the third surface.

16. The electronic device according to claim 9, wherein when the first limit element is located at the first location and the second limit element is located at the third location, the second limit element does not lock the first limit element and the first limit element does not lock the connecting plate so that the detachable expansion card is suitable to be detached from the expansion slot.

* * * * *